United States Patent
Fan et al.

(10) Patent No.: US 10,819,113 B2
(45) Date of Patent: Oct. 27, 2020

(54) SMART LIGHT SWITCH WITH TEMPERATURE SENSING

(71) Applicant: ECOBEE INC., Toronto (CA)

(72) Inventors: Wei Fan, Toronto (CA); Sina Shahandeh, East York (CA)

(73) Assignee: ECOBEE INC., Toronto (CA)

( * ) Notice: Subject to any disclaimer, the term of this patent is extended or adjusted under 35 U.S.C. 154(b) by 0 days.

(21) Appl. No.: 16/357,762

(22) Filed: Mar. 19, 2019

(65) Prior Publication Data

US 2019/0296550 A1    Sep. 26, 2019

Related U.S. Application Data

(60) Provisional application No. 62/645,248, filed on Mar. 20, 2018.

(51) Int. Cl.
| | |
|---|---|
| H05B 47/10 | (2020.01) |
| H02J 3/14 | (2006.01) |
| H02P 29/40 | (2016.01) |
| H05B 47/19 | (2020.01) |
| H05B 47/105 | (2020.01) |
| H05B 47/00 | (2020.01) |

(52) U.S. Cl.
CPC ............. *H02J 3/14* (2013.01); *H02P 29/40* (2016.02); *H05B 47/00* (2020.01); *H05B 47/10* (2020.01); *H05B 47/105* (2020.01); *H05B 47/19* (2020.01); *H02J 2310/14* (2020.01)

(58) Field of Classification Search
CPC ......... H02J 3/14; H02J 2310/14; H02P 29/40; H05B 47/19; H05B 47/105; H04B 47/10
See application file for complete search history.

(56) References Cited

U.S. PATENT DOCUMENTS

| | | |
|---|---|---|
| 5,248,919 A | 9/1993 | Hanna et al. |
| 7,019,276 B2 | 3/2006 | Cloutier et al. |
| 8,410,706 B2 | 4/2013 | Steiner et al. |
| 9,699,874 B2 | 7/2017 | Phillips |
| 2011/0307112 A1 | 12/2011 | Barrilleaux |
| 2012/0095601 A1 | 4/2012 | Abraham et al. |
| 2013/0285556 A1 | 10/2013 | Challapali et al. |

*Primary Examiner* — Dinh T Le

(74) *Attorney, Agent, or Firm* — Perry + Currier Inc.

(57) ABSTRACT

A smart light switch includes a control block and heat generating components such as a light actuator, a processor and memory, a data communications module, and an environmental sensor. The processor is operable to receive as an input a measured temperature value from the environmental sensor and a power consumption value from the of heat generating components. The processor is operable to select a temperature offset value from a dataset of temperature offset values that is stored in memory. Each temperature offset value stored in the dataset of temperature offset values is associated with a potential combination of power consumption inputs. The processor is further operable to determine a calibrated temperature value from the measured temperature value adjusted by the temperature offset values selected from the dataset of temperature offset values.

9 Claims, 12 Drawing Sheets

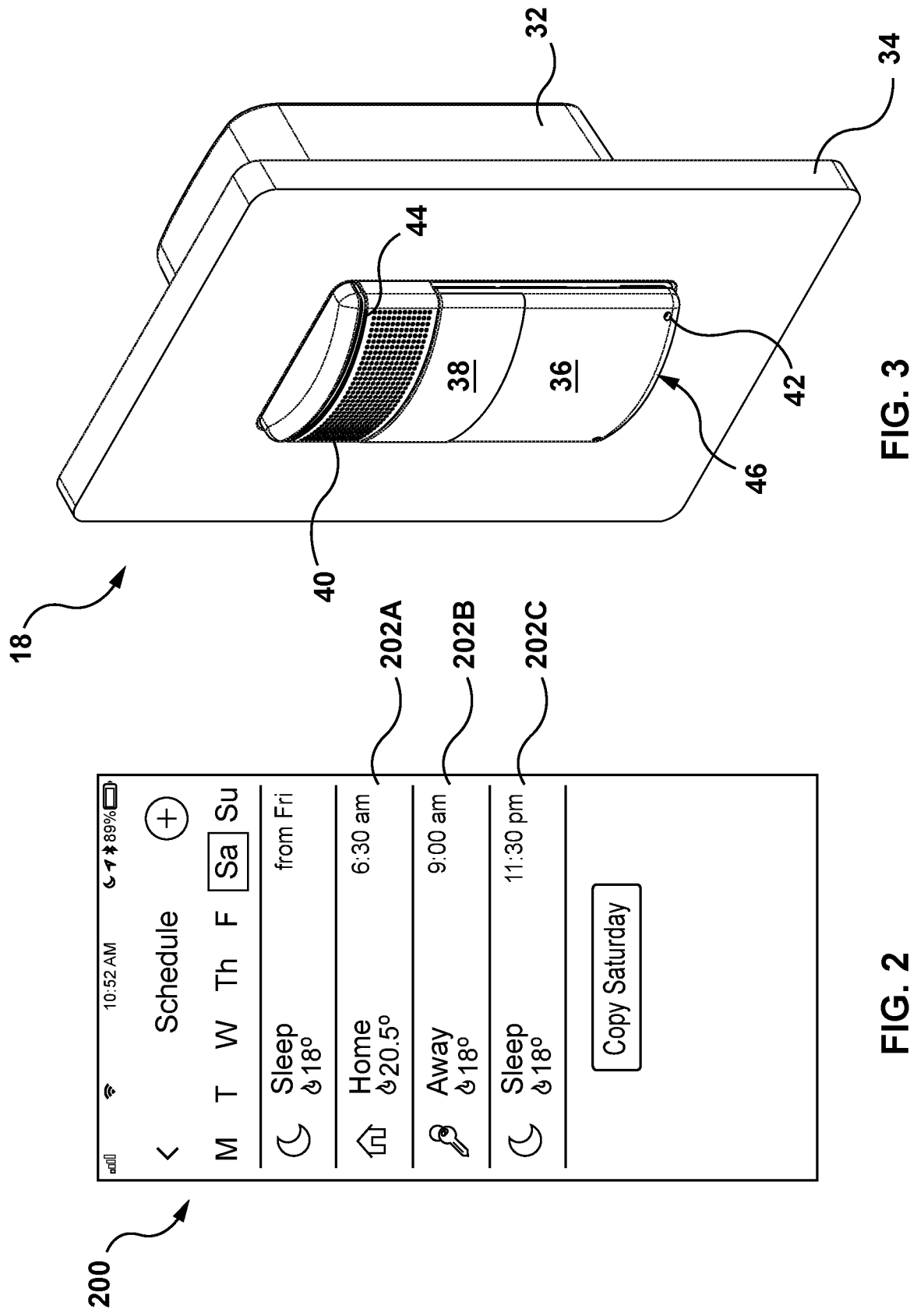

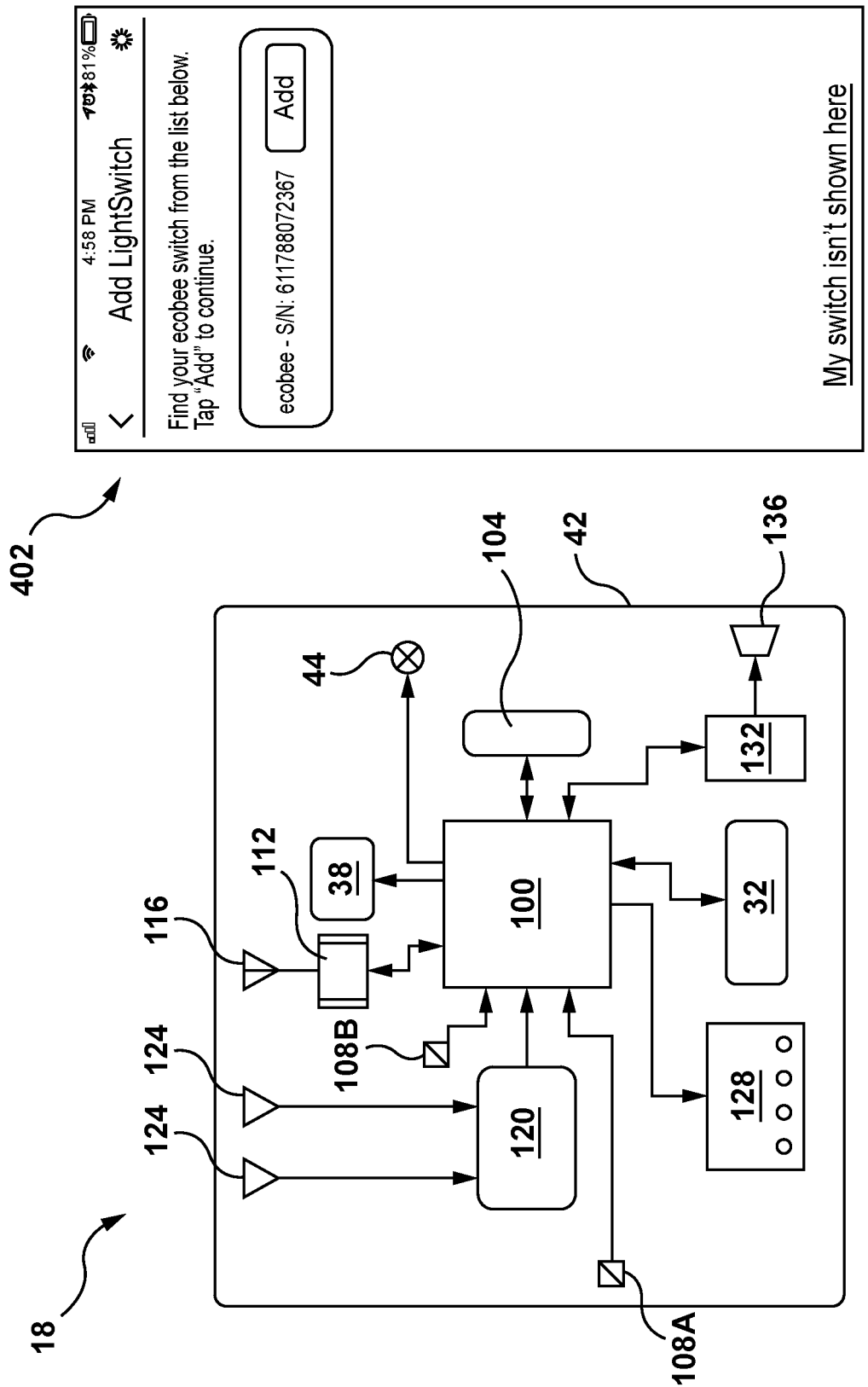

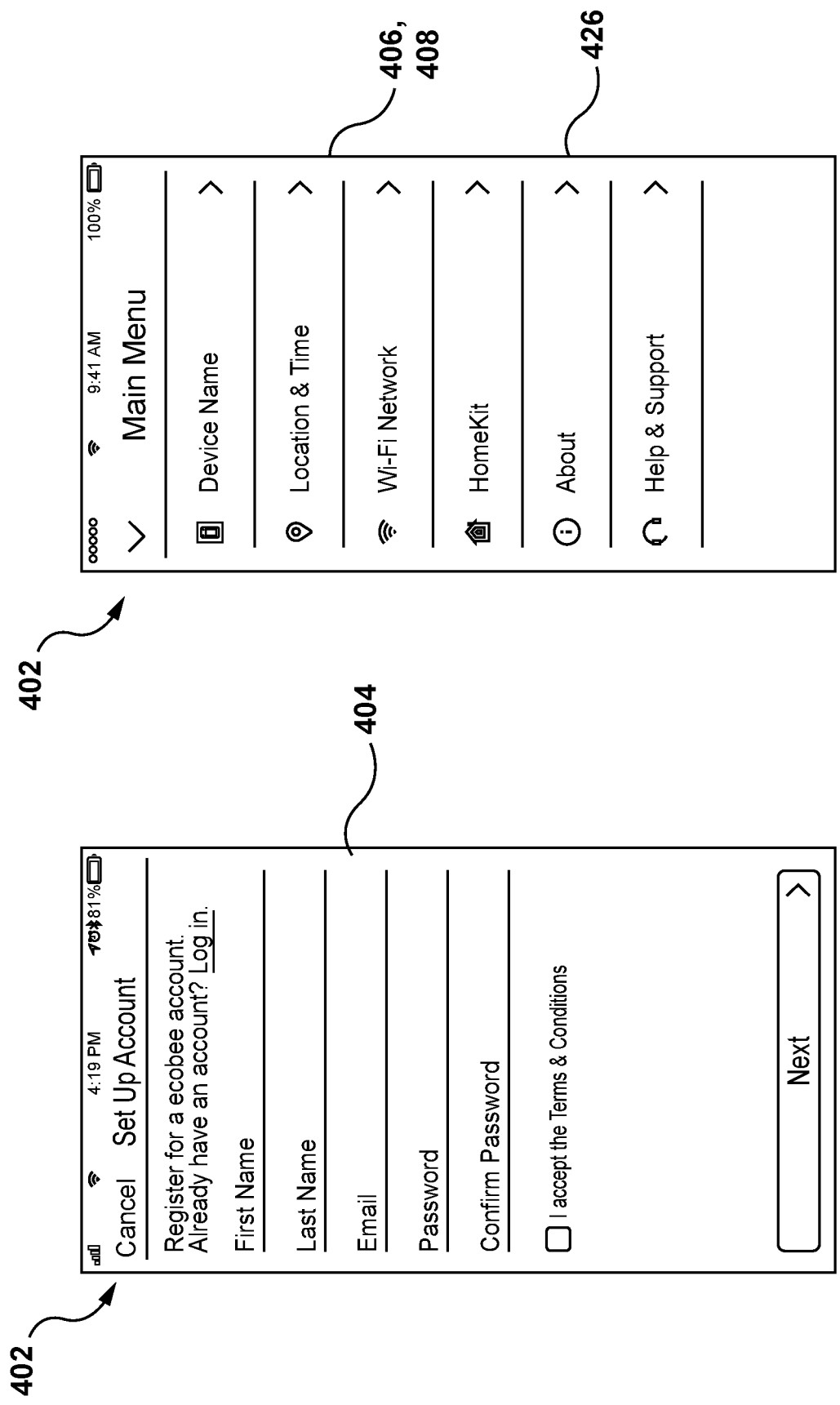

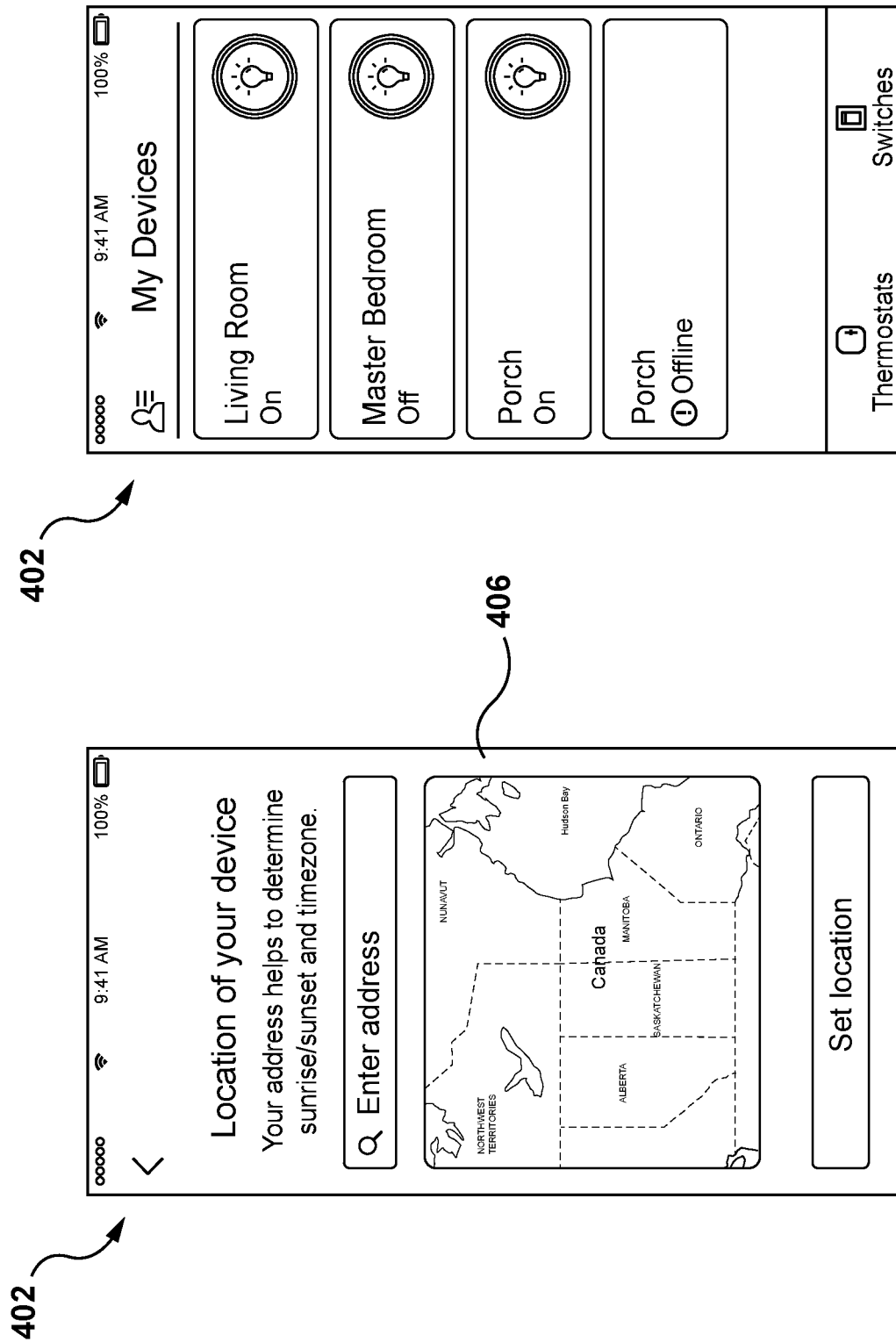

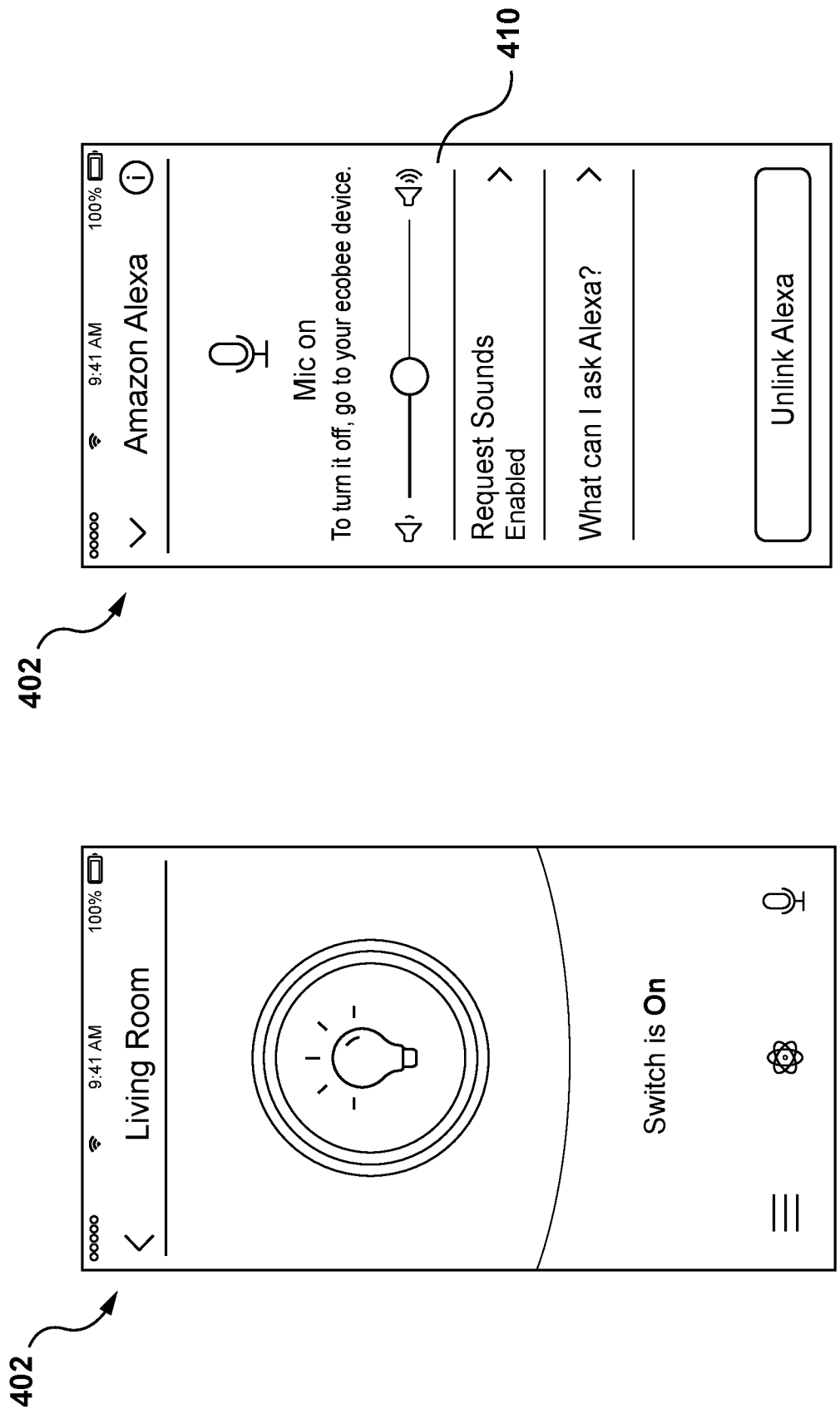

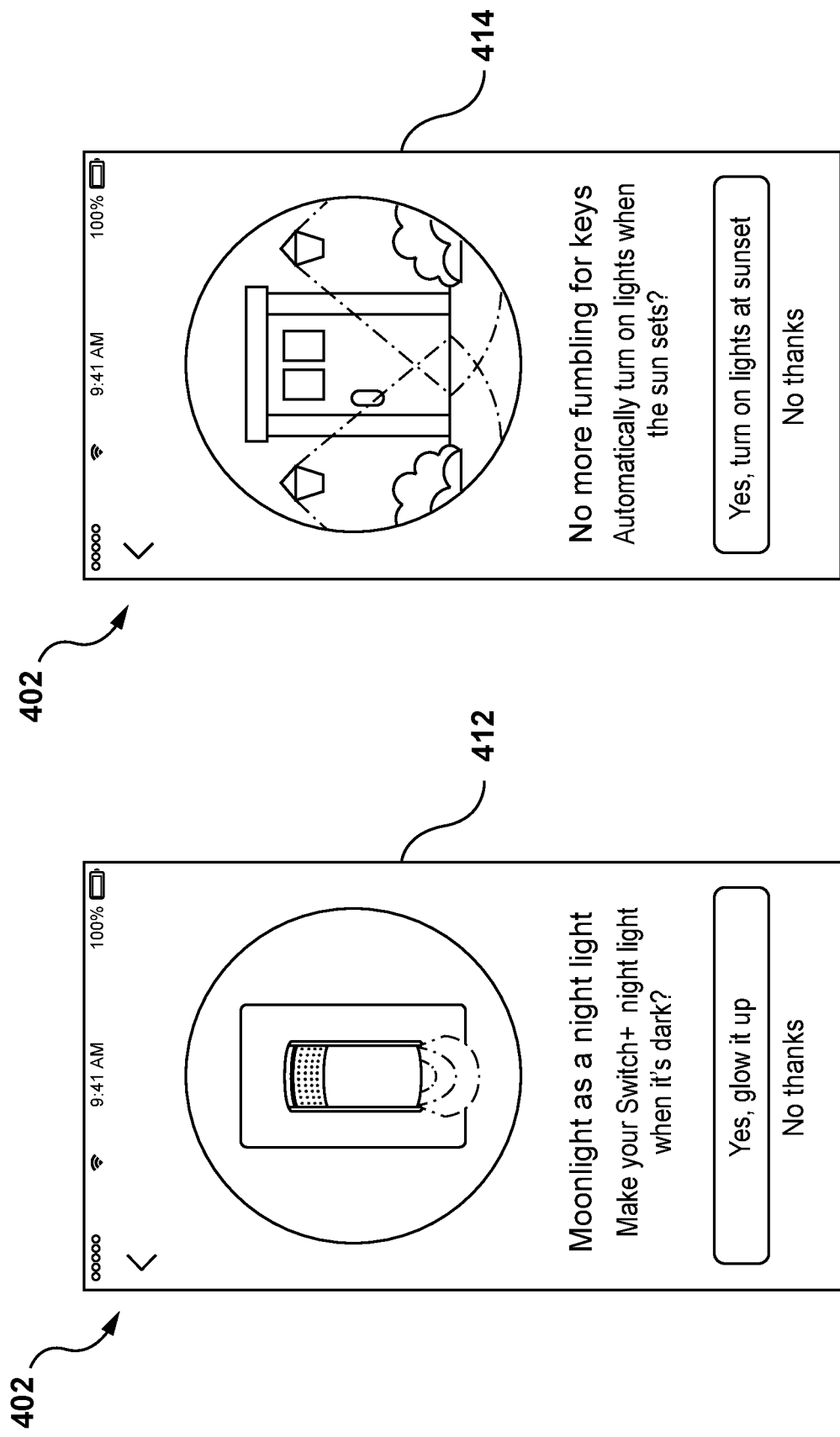

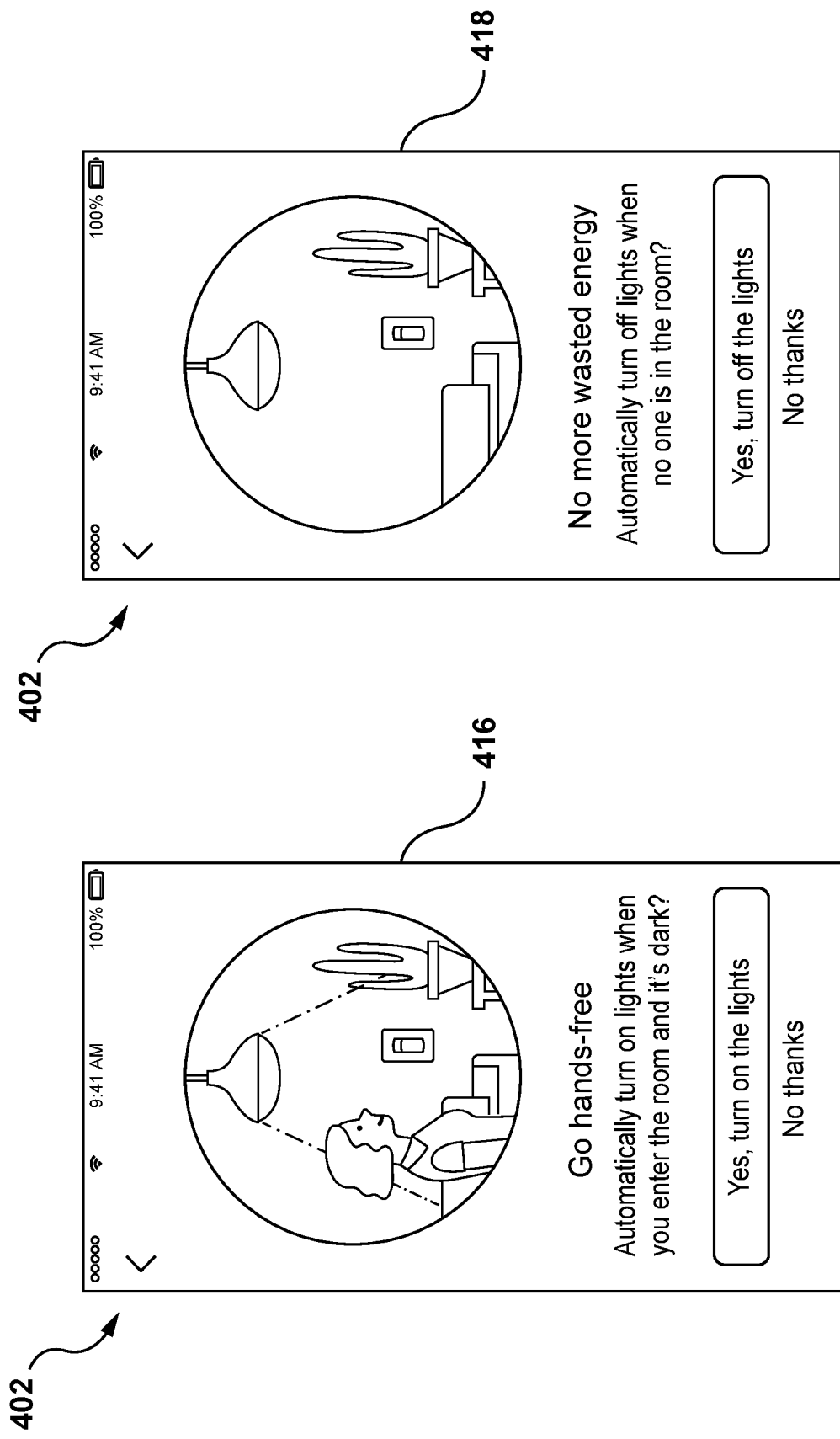

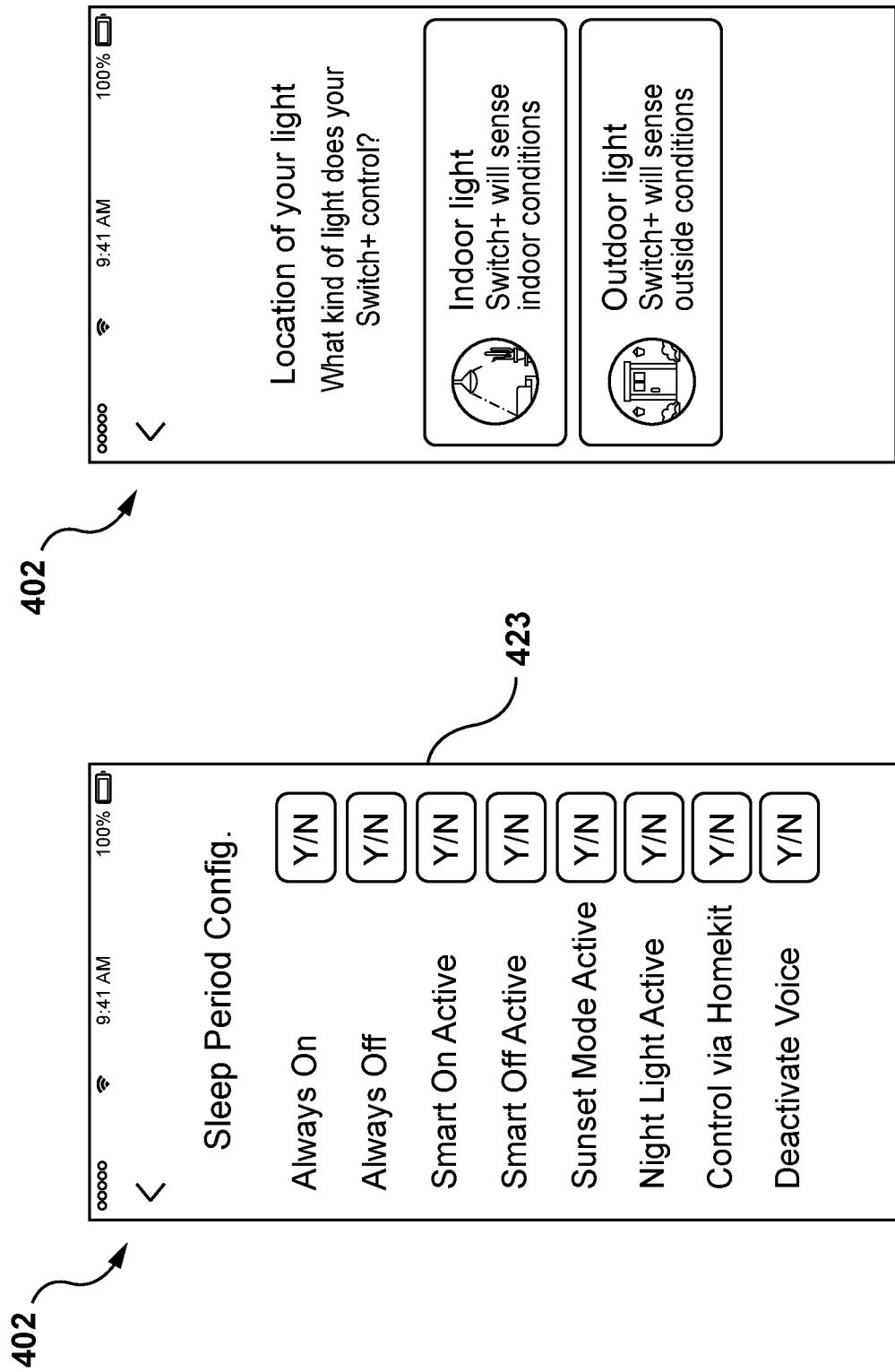

SMART LIGHT SWITCH WITH TEMPERATURE SENSING

CROSS-REFERENCE TO RELATED APPLICATIONS

This application claims the benefit of the U.S. 62/645,248, filed Mar. 20, 2018, the entirety of which is incorporated herein by reference.

FIELD OF THE INVENTION

The present invention relates to light switches. More specifically, the present invention relates to Internet-enabled light switches with smart features.

SUMMARY OF THE INVENTION

It is an object of the present invention to provide a novel smart light switch which obviates or mitigates at least one disadvantage of the prior art.

BRIEF DESCRIPTION OF THE DRAWINGS

Preferred embodiments of the present invention will now be described, by way of example only, with reference to the attached Figures, wherein:

FIG. 2 shows an illustration of a schedule for the smart thermostat shown in FIG. 1, presented on a remote device shown in FIG. 1;

FIG. 3 shows an isometric view of the smart light switch shown in FIG. 1;

FIG. 4 shows a block diagram of the hardware of the smart light switch shown in FIG. 3;

FIG. 5 shows an illustration of an installation wizard for the smart light switch shown in FIG. 3, presented on a remote device shown in FIG. 1;

FIG. 6 shows another illustration of an installation wizard for the smart light switch shown in FIG. 3, presented on a remote device shown in FIG. 1;

FIG. 7 shows another illustration of an installation wizard for the smart light switch shown in FIG. 3, presented on a remote device shown in FIG. 1;

FIG. 8 shows an illustration of an installation wizard for the smart light switch shown in FIG. 3, presented on a remote device shown in FIG. 1;

FIG. 9 shows an illustration of an application for controlling the smart light switch shown in FIG. 3, presented on a remote device shown in FIG. 1;

FIG. 10 shows another illustration of an application for controlling the smart light switch shown in FIG. 3, presented on a remote device shown in FIG. 1;

FIG. 11 shows an illustration for configuring a voice processing service on the application for controlling the smart light switch shown in FIG. 3, presented on a remote device shown in FIG. 1;

FIG. 12 shows an illustration for configuring a night light feature on the smart light switch shown in FIG. 3, using the application presented on a remote device shown in FIG. 1;

FIG. 13 shows an illustration for configuring a sunset feature on the smart light switch shown in FIG. 3, using the application presented on a remote device shown in FIG. 1;

FIG. 14 shows an illustration for configuring a Smart On feature on the smart light switch shown in FIG. 3, using the application presented on a remote device shown in FIG. 1;

FIG. 15 shows an illustration for configuring a Smart Off feature on the smart light switch shown in FIG. 3, using the application presented on a remote device shown in FIG. 1;

FIG. 18 shows another illustration for configuring a Scheduling feature on the smart light switch shown in FIG. 3, using the application presented on a remote device shown in FIG. 1;

FIG. 19 shows an illustration for configuring a location feature on the smart light switch shown in FIG. 3, using the application presented on a remote device shown in FIG. 1;

DETAILED DESCRIPTION OF THE INVENTION

Figure 1:
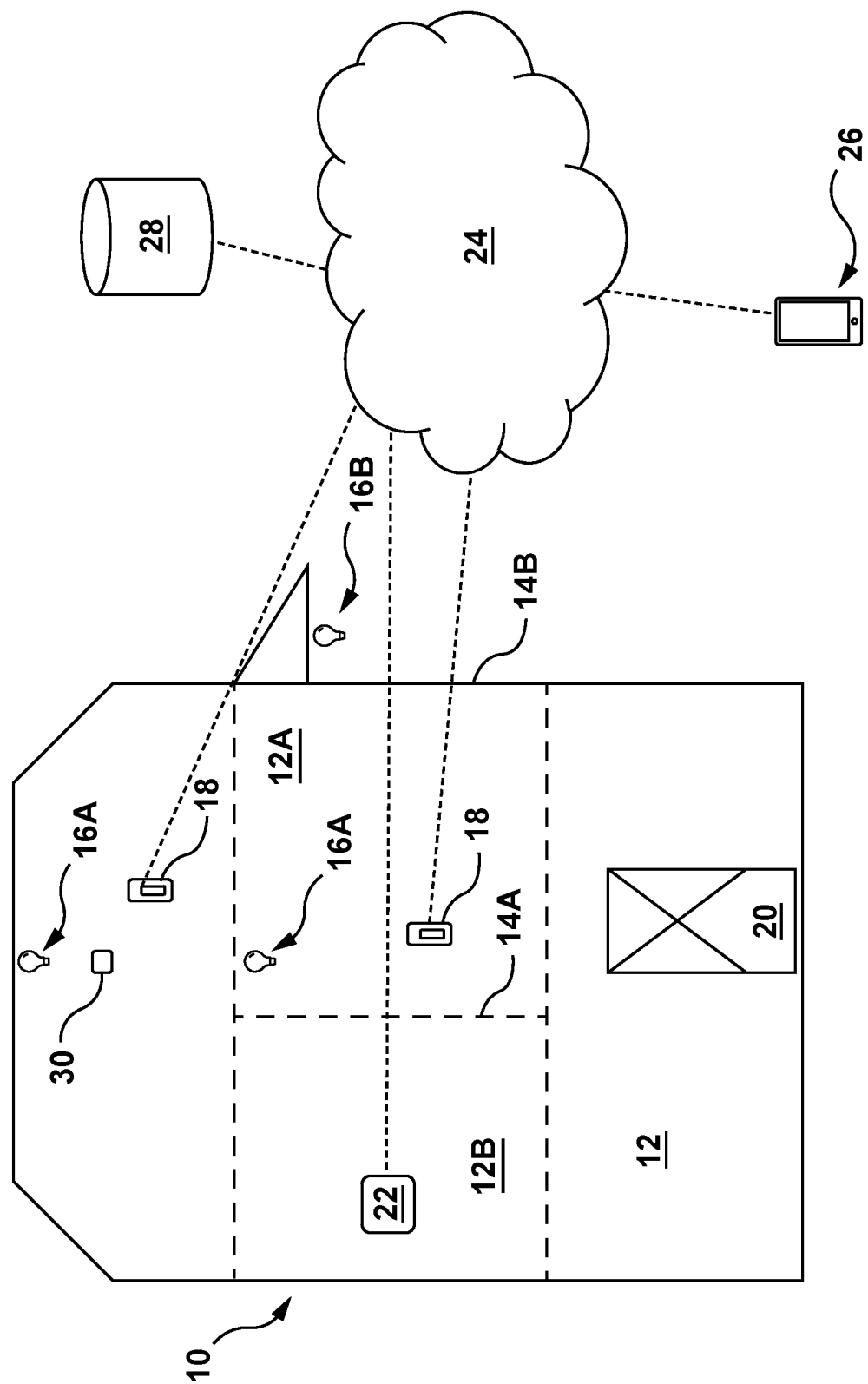
FIG. 1 shows a diagram of a smart light switch and a smart thermostat located within a premise, in accordance with an embodiment of the present invention.

Referring now to FIG. 1, a premise is shown generally at 10. Premise 10 is typically a residential home, but could also be a commercial building. Premise 10 is defined by and subdivided into multiple rooms 12 (functionally, the kitchen, bedroom, hallway, etc.) by a plurality of walls 14. Some walls 14 are interior walls 14A (including both load-bearing and non-load bearing walls) and some are exterior walls 14B (thicker load-bearing walls, preferably well insulated). For simplicity, other features of premise 10 such as doors, windows, stairs, etc. have been omitted from FIG. 1.

Lighting in each room 12 is preferably provided by room light 16. Room light 16 can include individually socketed light bulbs, pot lights, fluorescent lighting, etc. Room lighting includes both interior room light 16A, as well as external lighting 16B (porch lights, etc.). Control of room light 16 is provided by smart light switch(s) 18. Depending on the electrical wiring for each room 12, each set of room light 16 may be controlled by one or more smart light switch(s) 18, which may be single pole, dual pole, etc. Preferably, each smart light switch 18 is equipped with wireless communication protocols such as Wi-Fi or Bluetooth to connect to a network 24 too provide for remote control of smart light switch(s) 18 from a remote device 26, which is typically a mobile phone or computer. Network 24 can include a local area networks (LAN) as well as connectivity to the Internet via a router (not depicted). The remote devices 26 may communicate with the smart light switch 18 directly on same network 24 or indirectly via a remote server 28 across the Internet. The hardware and software features of smart light switches 18 will be described in greater detail below. Remote server 28 may provide additional functionality (in the form of Software as Service, or SaaS), such as energy modeling, historical runtime reports, time and weather services, as well as third-party voice processing services such as the Amazon Alexa service.

Premise 10 further includes a HVAC system 20, which may include various heating and cooling systems furnaces, air conditioning systems, fans, heat pumps, humidification/dehumidification systems and the like. HVAC system 20 is controlled by a thermostat 22. In the illustrated embodiment, thermostat 22 is a wireless communicating thermostat, such as the ecobee3 or ecobee 4 smart thermostat. Preferably, thermostat 22 is equipped with wireless communication protocols such as Wi-Fi or Bluetooth to connect to the network 24 too provide for remote control of thermostat 22 from the remote device 26. The remote devices 26 may communicating with thermostat 22 directly on same network 24 or indirectly via the remote server 28 across the Internet.

Thermostat 22 is further in wireless communication with a one or more remote sensor(s) 30, which can provide different sensor readings such as occupancy, temperature, humidity, as well as CO or CO2 values to thermostat 22. Thermostat 22 is operable remote sensor(s) to provide temperature averaging for its readings, prioritize temperature values in rooms where occupancy is detected, and/or reduce the usage of HVAC system 20 when no occupancy is detected within premise 10 for an extended period of time.

Figure 20:
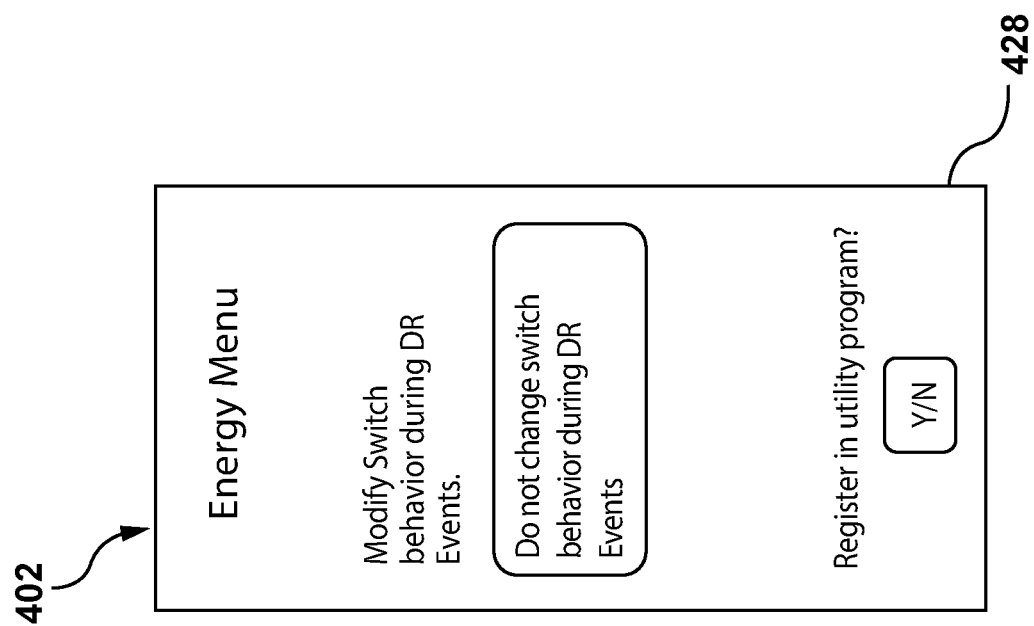
FIG. 20 shows an illustration for configuring an Energy feature on the smart light switch shown in FIG. 3, using the application presented on a remote device shown in FIG. 1.

Thermostat 22 is adapted to control HVAC system 20 via a programming schedule. An example of a program schedule as displayed on the remote device 26 is shown in FIG. 20 generally at 200. Programming schedule 200 is preferably a seven-day schedule, where each day has one or more schedule periods 202 (such as an HOME period 202A, an AWAY period 202B, a SLEEP period 202C, etc.), where each schedule period may have different heating and cooling set points.

Smart Light Switch Hardware

As mentioned previously, control of the room light 16 in premise 10 is provided by light switch(s) 18. Referring now to FIG. 3, smart light switch 18 is shown in greater detail. Smart light switch 18 comprises a housing 32 adapted to be mounted to an electrical box (not shown) located within wall 14. A trim plate 34 is placed around housing 32 to cover any rough edging in the wall 14 around smart light switch 18. On the front surface of smart light switch 18 is a light actuator 36 which is operable to switch room light 16 on or off, or modify the brightness of room light 16 (when room light 16 is a dimming light). Light actuator 36 may be a simple mechanical On/Off button, a mechanical slide adapted to provide dimming control, a capacitive or pressure-sensitive touch interface, or other interface suitably adapted to provide light control as is known to those of skill in the art. In the presently illustrated embodiment, light actuator 36 is an On/Off button.

Also located on the front surface of smart light switch 18 is a visual sensor 38. In the present embodiment, visual sensor 38 includes a motion/occupancy sensor adapted to detect a person's presence nearby as well as detect nearby light levels, and is also adapted to turn room light 16 On or Off when in specified programming modes (discussed further below). Other types of visual sensors (such as cameras with image recognition) may also be used to provide the capabilities of visual sensor 38.

Smart light switch 18 further includes a speaker grate 40 which allows sounds emitted from an internal speaker (also discussed below), and microphone aperture(s) 42 which allow sounds from outside housing 32 to reach one or more internal microphones (described below). As is discussed in greater detail below, smart light switch 18 may also be voice-controlled to turn the room light 16 On or Off.

Also located on smart light switch 18 is an activity indicator 44, which can be a light pipe driven by one or more LEDs, a lamp assembly, etc. Activity indicator 44 is adapted to illuminate whenever the voice control feature of smart light switch 18 is engaged. Smart light switch 18 may also include a night light 46, which is also driven by one or more LEDs, etc. In the present embodiment, night light 46 is an LED light pipe which is housed within the rounded barrel shape of light actuator 36, illuminating when active, the base of trim plate 34. In some embodiments, the hardware of activity indicator 44 and night light 46 may be physically combined and powered by a singe light source.

FIG. 4 shows a block diagram of the hardware of smart light switch 18. Smart light switch 18 includes an application processor 100, which can be a microprocessor or any other suitable device as will occur to those of skill in the art. Processor 100 is capable of running at different clock rates, to match available program execution rates to computational needs, which can change from time to time. Such multi rate processors are well known. Smart light switch 18 further includes memory 104, which can be non-volatile RAM and/or volatile RAM which is accessible by processor 100. As will be apparent to those of skill in the art, memory 104 can be integral with processor 100, or can be separate discrete devices or components, as desired. Typically, memory 104 will store one or more programs for execution by processor 100, as well as various parameters relating to the execution of the programs and data and working values required by the programs.

Light actuator 36 is operatively connected to processor 100, as is the visual sensor 38. Smart light switch 18 further preferably includes a real time clock, either as a service provided in processor 100, or as a separate component (not shown). Smart light switch 18 can also include at least one environmental sensor 108, which at a minimum is a temperature sensor but can also include other environmental sensors, such as a humidity sensor, ambient light sensor, magnetic compass, GPS receiver, etc. which determine respective environmental conditions to be controlled and/or monitored. Typically, environmental sensors 108 in smart light switch 18 will include at least both a temperature sensor (i.e., a thermistor) and a humidity sensor. Preferably, environmental sensor 108 will include a primary temperature sensor 108A and at least one secondary temperature sensor 108B located at a different location within housing 32. As will be described in greater detail below, the environmental sensor(s) 108 in smart light switch 18 is adapted to provide temperature measurements to thermostat 22 to help govern the operation of HVAC system 20.

A communication module 112 connected to processor 100 to allow processor 100 to communicate with network 24 and/or with additional external sensors or computerized devices (not shown). Preferably, communication module 112 is operable to connect to the desired data networks wirelessly, via an antenna 116, using at least one wireless communication protocol, such as Wi-Fi; Bluetooth; ZigBee; ZWave; Cellular Data, etc., but it is also contemplated that communication module 112 can have a wired connection to the data networks, such as via an Ethernet connection.

Communication module 112 also allows smart light switch 18 to communicate with Internet based services provided by remote server 28 (such as weather servers, remote monitoring systems, data logging servers, voice processing services, etc.) and with applications used remotely by users of smart light switch 18 via remote device 26 to monitor and control the controlled premises' environmental state or other conditions. For example, a user remote from smart light switch 18 may access an application executing on remote device 26 to send commands to smart light switch 18, via network 24, to alter the operation of smart light switch 18 or a system it is controlling. Furthermore, smart light switch 18 is operable to communicate with thermostat 22 either directly (via a mesh network or point-to-point protocol across network 24) or indirectly via remote server 28, providing occupancy data from visual sensor 38 and temperature data from environmental sensor 108.

Smart light switch 18 further includes a secondary processor assembly 120, which is capable of digitizing and processing, as described in more detail below, audio signals received from at least one, and preferably two or more, microphones 124. In the present embodiment, secondary processor assembly 120 is a DSP (digital signal processor) which can receive inputs from microphones 124 (which are located adjacent microphone apertures 42), digitize them and perform signal processing operations on those digitized signals in accordance with one or more programs stored within the DSP. While the current embodiment employs a single device DSP with the required capabilities, it is also contemplated that secondary processor assembly 120 can be constructed from two or more discrete components, if desired. It is also contemplated that secondary processor assembly 120 can be a separate computational core, or cores, included in processor 100.

Smart light switch 18 further includes a control block 128, which can be physically connected to one or more wires for the light to be controlled by smart light switch 18 (typically hot and cold power lines, neutral and ground). Control block 128 can include mechanical, or solid state, relays adapted to provide control to the attached load in accordance with one or more programs executed by processor 100.

Smart light switch 18 further includes an audio output subsystem 132, which is operable in response to signals received from processor 100, to output an amplified audio signal to a speaker system 136. The output of speaker system 136 can be heard through speaker grate 40. Audio output subsystem 132 can be a discrete device, or combination of suitable discrete devices, as desired and is preferably capable of outputting voice signals and/or music or other sounds.

User inputs to smart light switch 18 can be achieved via internet-connected applications running on smartphones or remote devices 26 and/or responses from cloud-based processing of voice commands received from the remote processing service on remote severs 28 by smart light switch 18. When smart light switch 18 also serves as a voice command input device for such commands, a user's spoken voice commands are received by microphones 124 and, as is described in more detail below, a representation of that received audio is transmitted by smart light switch 18 over network 24 to the remote processing service on remote servers 28. The remote processing service receives the transmitted representation of the audio and determines the meaning of the spoken voice commands and prepares an appropriate response which is then returned to smart light switch 18 for execution, or otherwise processed by another device or service.

Depending upon the range of services offered by the remote voice processing service, the response to a spoken voice command can be selected from a wide range of responses. For example, the remote processing service may have a limited set of available responses, all directly related to the control and operation of smart light switch 18, i.e. the voice command could turn the room lights on or off, or modify their operation by dimming the lights (if smart light switch 18 provides dimming functions). Alternatively, if the remote processing service has addition controls, the voice command received via microphones 124 could control other associated devices such as thermostat 22—the voice command could have been a request to raise the temperature of HVAC system 20. In a more preferred embodiment, the remote voice processing service is a broadly capable system, such as the above-mentioned ALEXA Voice Service, and the voice commands which can be processed range far beyond those specifically related to the control and operation of smart light switch 18. For example, a user can ask for the current time and the remote voice processing service will return an audio stream of a voice saying the current time to smart light switch 18, along with the program commands necessary to have that audio stream played to the user through speaker 136.

Similarly, the user may order fast food, such as a pizza, by voice command to smart light switch 18 and the remote voice processing service will complete the order, perhaps through an interactive set of audio exchanges with the user through microphones 124 and speaker 136 or in accordance with predefined settings (size of pizza, toppings, payment method, etc.) previously defined by the user, and will forward the resulting order through the internet to the pizza supplier while confirming the same to the user via an appropriate audio voice stream output at smart light switch 18. In this regard, computerized smart light switch 18 can perform many or all of the functions of a voice command input device such as the Amazon Echo device, typically used to interact with the ALEXA voice service, or the corresponding Google Home device and service, etc. in addition to performing it's other control functions, such as regulating temperature and/or humidity in an environment.

Registration of Smart Light Switch 18

When a smart light switch 18 is installed in a wall 14 and connected through control block 128, it will operate like a traditional light switch or traditional dimming light switch via lighting activator 36. However, it gains additional functionality when connected to network 24. Using remote device 26, it is possible to connect smart light switch 18 to network 24 and register it on remote server 28. By registering smart light switch 18, it may be operably controlled by the remote device 26 and connected to thermostat 22.

When first installed and not registered with remote server 28, smart light switch 18 will broadcast itself across any detected networks 24 via established discovery protocols that can be detected via a remote application 402 running on remote device 26. FIG. 5 shows an example of a remote application running on remote device 26. The remote application may be a dedicated application or a web-based application. The user may then connect the switch to the desired network 24.

Once connected to the desired network 24, the smart light switch 18 will communicate with remote server 28 in order to register the smart light switch 18 with a user account 404 (FIG. 6). Using remote application 402, the user will either create a new account 404 on remote server 28 for smart light switch 18, or associate it with an existing account 404 on remote server 28.

The user will then be asked to provide additional details about the smart light switch 18 such as its geographical location 406, and internal location 408 within premise 10. Geographical location 406 may be derived from the GPS location of remote device 26, the location of network 24 as shown via a map of networks accessed by remote server 28, or via manual entry by the user within remote application 402, as shown in FIG. 8). By determining geographical location 406, the time zone of smart light switch 18 is also determined. For internal location 408, the user will be asked to identify the location of smart light switch 18 within a premise, such as BEDROOM, HALLWAY, KITCHEN, or OUTSIDE, etc. The user may also provide a custom name and location for the smart light switch 18.

If the account 404 is already associated with a thermostat 22, the user will be asked if he or she wishes to link smart light switch 18 with thermostat 22. By linking smart light switch 18 with thermostat 22, smart light switch 18 will be able to provide temperature and occupancy data from its environmental sensor 108 and visual sensor 38 to thermostat 22 and act as a remote sensor 30 for thermostat 22. Furthermore, the user may be asked if he or she wishes to link a programming schedule of the smart light 18 with the programming schedule on smart thermostat 22, for rules-based control of smart light switch 18 (described in more detail below).

Also during installation, the user will be able to associate the smart light switch 18 with a preferred remote voice processing service such as Alexa, and link switch 18 with the user's own account on that voice processing service. Depending on the embodiment, the user may be able to associate the smart light switch 18 (each with a different activating wake word) with one or more different remote voice processing services.

Lighting Control

As seen in FIG. 9, using remote application 402, the user may control any associated smart light switch(s) 18 and thermostat(s) 22. By selecting a particular smart light switch 18, the user can see its ON or OFF status and control it directly to turn that smart light switch 18 on or off (FIG. 10). In switches 18 with dimming feature, the brightness of the light may also be adjusted.

In addition to direct control, a user may use remote application 402 to configure the behavior of their smart light switch 18 and its smart features. Smart features on smart light switch 18 may include voice control 410, night light control 412, sunset mode 414, Smart On 416, Smart Off 418, vacation mode 420, schedule mode 422, an additional schedule configuration menu 423, and Energy menu 428.

Using voice control 410, a user may turn a light on or off simply by using the associated remote processing service. For example, a user may simply say "Alexa, turn off the kitchen light" (where Alexa is the associated voice processing service), and the smart light switch 18 that has an internal location 408 of KITCHEN will be turned off. In cases where a user says "Alexa, turn off the light", then the smart light switch 18 nearest to the user (as determined by the signal strength of its microphones 124) will turn off. By saying "Alexa, turn of the lights" or "Alexa, I'm leaving", then all the associated switches 18 in premise 10 will be turned off. Using remote application 402, a user may determine whether that particular switch is associated with the voice processing service (Mic on or Mic Off), the volume the speaker assembly 136 and whether the smart light switch 18 beeps if it begins to listen for commands (Request Sounds), as shown in FIG. 11

Using night light control 412, the user may configure the behavior of night light 46 (see for example, FIG. 12). For example, the brightness level of night light 46 when engaged may be configured. The user may also configure night light 46 to turn on based upon the detected light levels of visual sensor 38 (i.e., turn it on when it gets dark), by occupancy detection via visual sensor 38 (i.e., turn it on when somebody enters the room), or a combination of the two. Alternatively, night light 46 may be actuated based upon the sunset time (as determined by geographical location 406), or by the scheduling mode 202 set within thermostat 22. For example, night light 46 could be engaged whenever thermostat 22 enters the Sleep scheduling period 202C, but turned off whenever thermostat 22 is in Home period 202A or Away 202B.

Using Sunset mode 414, the user may configure the behavior of the attached light based upon the upon the sunset time (as determined by geographical location 406). For example, a light may automatically turn on at sunset and turn off at dawn (FIG. 13). In some embodiments, a user may set a delay for when the Sunset mode is activated (for example, switching Sunset mode on sixty minutes after sunset has occurred), and have Sunset mode deactivated for a period of time before sunrise (for example, switching sunset mode 414 off thirty minutes before sunrise). Alternatively, the light may automatically turn on after sunset only when visual sensor 38 detects a person nearby.

Using Smart On 416 (FIG. 14), smart light switch 18 will automatically turn the room light 16 on when visual sensor 38 detects a person within the room 12, and the room 12 is dark, as determined by visual sensor 38. In some embodiments, Smart On 416 may be selectively disabled for periods of time (described in more detail below).

Using Smart Off 418 (FIG. 15), smart light switch 18 will automatically turn the room light 16 off when visual sensor 38 detects that no one is in the room after a period of time. The default period of time required to trigger Smart Off 418 is five minutes, but this period may be lengthened or shortened by the user using remote application 402.

Figures 16, 17:
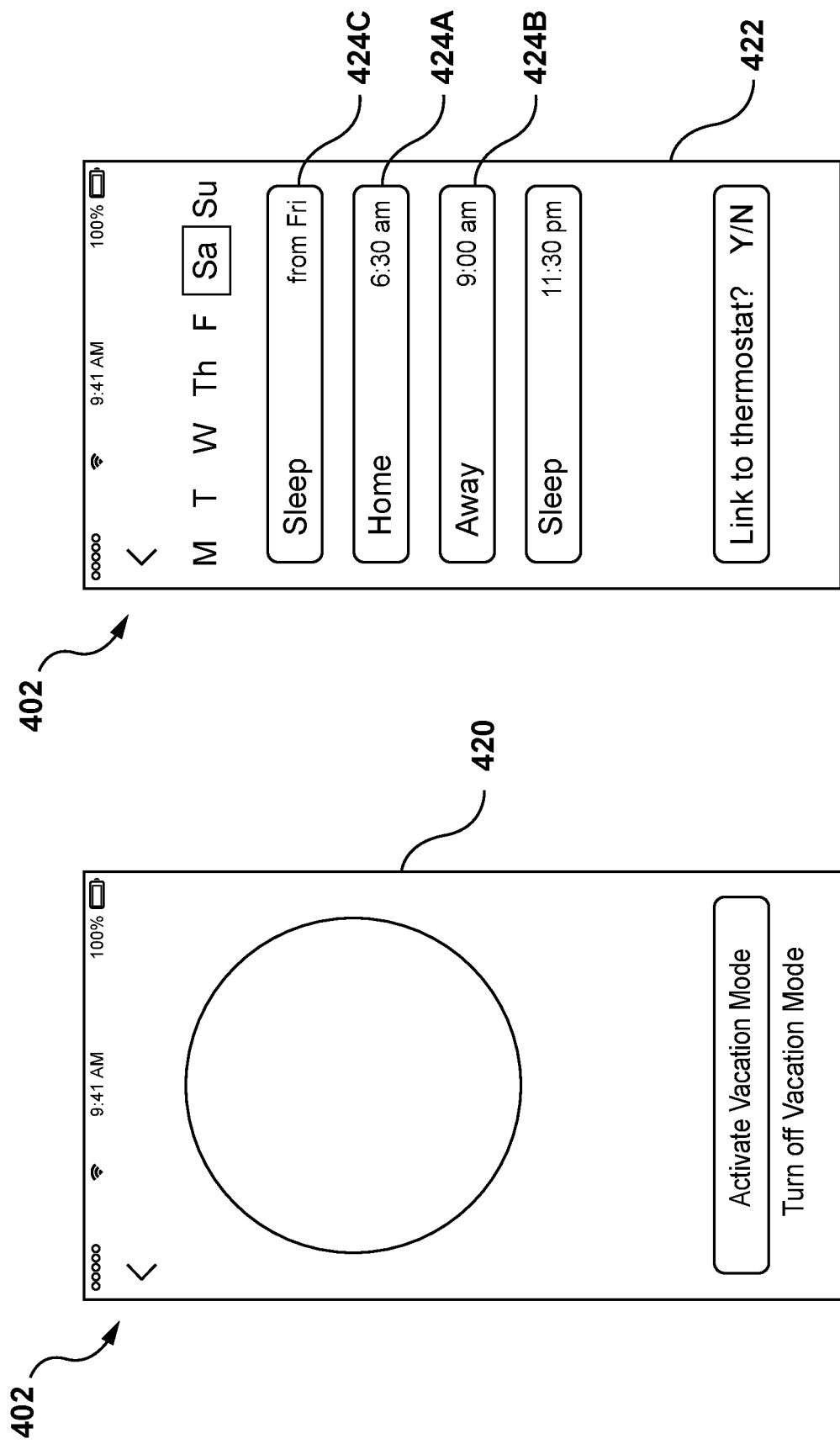
FIG. 16 shows an illustration for configuring a Vacation mode feature on the smart light switch shown in FIG. 3, using the application presented on a remote device shown in FIG. 1.
FIG. 17 shows an illustration for configuring a Scheduling feature on the smart light switch shown in FIG. 3, using the application presented on a remote device shown in FIG. 1.

Using vacation mode 420 (FIG. 16), the normal operation and scheduling (i.e., set of activation rules) of smart light switch 18 is suspended. Instead, when smart light switch 18 is in vacation mode 420, it will intermittently turn its light on for periods of time to simulate the presence of people in premise 10. While in vacation mode 420, during periods of darkness (as determined by either visual sensor 38 or by sunset time), smart light switch 18 will intermittently turn the room light 16 on for a period of time. The default period of time for the light to be on in Vacation mode is five minutes, but this period may be lengthened or shortened by the user using remote application 402. While in vacation mode 416, light switches 18 that have an internal location 406 of OUTSIDE, will always turn on when the visual sensor 38 detects motion nearby.

Alternatively, in some embodiments, smart light switch 18 may learn the light activation behaviors of the users, by tracking when the light is turned on or off (via the light actuator 36, the Smart On 416 feature, etc.), storing this On/Off state data in memory 104 or on remote server 28. Given this historical data, processor 100 may calculate the probability that the room light 16 would be on at any particular time, and the average length of time that that the light remains on. Processor 100 may then activate engaging the room light 16 probabilistically and for variable periods of time based upon the historical data. In this way, smart light switch 18 will provide a realistic approximation of lighting activity as if premise 10 were currently inhabited.

Using Scheduling Mode 422 (FIG. 17), the user may modify the behavior of smart light switch 18 using a set of light activation rules stored in a programmed schedule 422. Programmed schedule 422 may have various scheduling periods 424, such as HOME period 424A, an AWAY period 424B, a SLEEP period 424C, etc.). The user is free to set the start and end times for each scheduling period using a seven-day schedule 422. Alternatively, if account 404 is associated with one or more thermostats 22, then the user may select a thermostat 22. In this case, the timing of scheduling periods 424 programmed schedule 422 may be automatically linked to program schedule 200 on thermostat 22 so that scheduling periods 424 are coterminous with scheduling periods 202 on thermostat 22. Updating the scheduling start or end periods on one of thermostat 22 and smart light switch 18 updates the scheduling periods on the other.

A user may customize the behavior of smart light switch 18 (i.e., light activation rules) for each scheduling period 424 (FIG. 18). In one embodiment, a user may simply select an Always ON or Always Off state for the associated light for each period 424. In some embodiments, a user may modify the behaviors of smart light switch 18 for each scheduling period 424. For example, a user may disable the Smart On 416 feature while in SLEEP period 424C, or enable Smart Off while in Away period 424B.

It is contemplated that the smart features displayed on remote application 402 may be arranged depending on the internal location 408 selected during registration (FIG. 19). For example, if smart light switch 18 has an internal location 408 of OUTSIDE, then the sunset mode 414 will be presented to the user. However, if smart light switch 18 has an internal location 408 of KITCHEN, then sunset mode 414 may not be presented to the user (or at least on the primary screen of remote application 402).

Using Configuration menu 426 (FIG. 7), a user may adjust various settings of their smart light switch 18, such as device name, their geographical location 406 or their internal location 408, their network 24 selection, as well as configuration with third party services such as Apple HomeKit or Samsung Smart Things.

Using Energy menu 428 (FIG. 20), the user may modify the behavior of smart light switch 18 based upon time of use rates or demand response events by the user's electrical utility. For example, a user may shorten the period of time used by Smart Off 414 or Vacation Mode 416 when a demand response has been issued by the local utility, or when the user is in a higher time of use rate category. The user may also register their smart light switch 18 with their local utility program. In this case, the remote server 28 will link smart light switch 18 with a participating utility program to allow for control or modification of smart light switch 18 via remote server 28.

Temperature Measurement Calibration

As is described above, the environmental sensor 108 is operable to provide temperature measuring of the room where smart light switch 18 is located. Temperature measurements can be sent to thermostat 22 via communication module 112. However, the non-calibrated temperature read by environmental sensor 108 is usually different with the true temperature in the room where the smart light switch 18 is located. This is because environmental sensor 108 is influenced by all the heat generating components mounted within inside housing 32. The heat generating components in the device (including, processor 100, secondary processor 120, speaker system 136, etc.) generate variable amounts of heat with various activities on smart light switch 18, like playing audio, turning on the activity indicator 44 or night light 46), even when running in a low-powered mode. A real-time calibration method is needed to compensate the temperature sensor data provided by environmental sensor 108 to provide accurate room temperature reading.

Compared with previous temperature calibration method developed for smart thermostats, smart light switch 18 includes additional challenges, including that the power wires attached to control block 128 will generate non-negligible heats inside of housing 32, depending on the load size of the room light, which is generally unknown to processor 100. The light load typically can range from 10 w to 500 w (deepening on the light source such as incandescent, LED, fluorescent, compact fluorescent, etc.). In addition, smart light switch 18 is usually installed inside of a wall 14. There are various types of walls and insulations (barely insulated, moderately insulated, heavily insulated, etc.), which will influence the speed and pattern of heat diffusion inside housing 32, impacting the temperature readings of environmental sensor 108.

Figure 21:
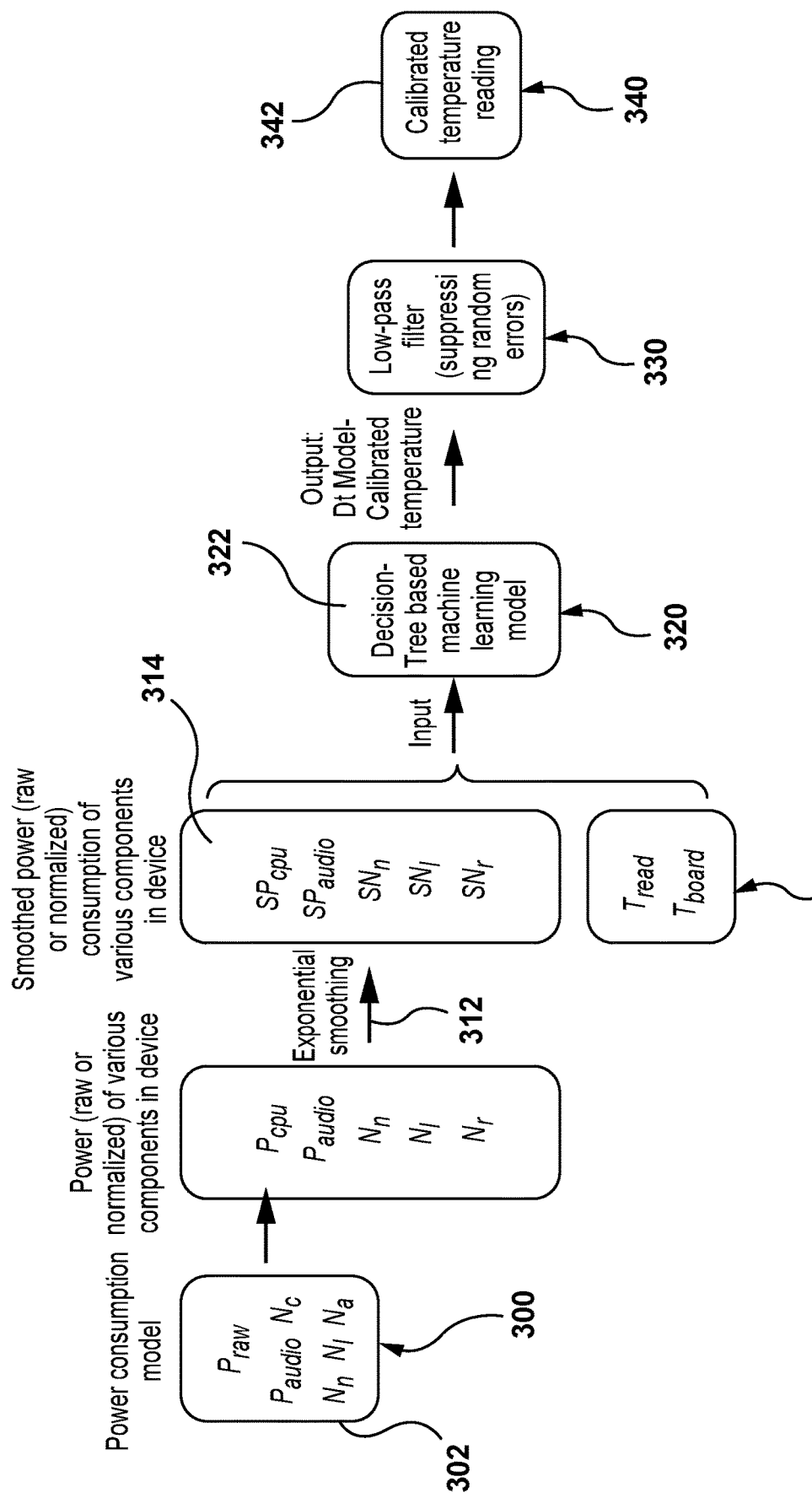
FIG. 21 shows a flowchart for calibrating a temperature reading on the smart light switch shown in FIG. 3.

Given the above difficulties, processor 100 includes a temperature compensation method, which is depicted generally in FIG. 21. Beginning at step 300, processor 100 gathers the measured temperature inputs 302 and power consumption inputs 304 (collectively, "inputs"), including:

(1) Temperature measurement on primary temperature sensor 108A ($T_{read}$)

(2) Temperature measurement on secondary temperature sensor 108B ($T_{board}$)

(3) Measurement of general power consumption on smart light switch 18 ($P_{raw}$)

(4) Measurement of power consumption of speaker assembly 136 ($P_{audio}$)

(5) Cpu-speed status of processor 100 and secondary processor 120 (low/high) ($N_c$)

(6) Nightlight 48 level status (0-10) ($N_n$)

(7) Activity Indicator 44 status (on/off) ($N_i$)

(8) Relay status of control block 128 (on/off) ($N_r$)

(9) Audio volume of speaker assembly 136 (0-100) $N_a$.

The various inputs can be taken as raw values or otherwise normalized by processor 100.

At step 310, processor 100 applies an exponential smoothing factor 312 to the various power consumption inputs 304 to create a continuous power consumption curve 314 for each power consumption input 304. The exponential smoothing factor 312 is approximation of the physical phenomena of heat diffusion and transferring within and without housing 32. The smoothing factor 312 controls the smoothness of the derived result. A small smoothing factor 312 represents a slow heat diffusion or transfer, while large smooth factor 312 indicates the heating takes effect quickly. Preferably, each heat-generating component (and thus its corresponding power consumption input 304) has its own smoothing factor 312.

At step 320, processor uses a decision tree 322 that is stored within memory 104 to provide a calibrated temperature offset value 324. Decision tree 322 is a predetermined dataset of temperature offset values 324 derived from thousands of various combinations of enabled and disabled power-consuming components, and determined from regressive analysis of thermal testing of smart light switch 18 under various load conditions and combinations against an external temperature sensor (not depicted).

At step 330, a low pass filter is applied to the output of decision tree 322 to suppress any random errors created in earlier steps of the method.

At step 340, a calibrated temperature value 342 derived from the raw values from environmental sensors 108 is provided. The calibrated temperature value 342 can then be transmitted to thermostat 22 via communication module 112 for use in determining set point control of HVAC system 20.

While decision tree 322 is prepopulated with temperature offset values 326 prior to installation of smart light switch 18, it is contemplated that the temperature offsets 326 could be periodically updated. During periods of inactivity, where room light 16 has been off for a period of time, and where the level of waste heat generated by the heat generating components of smart light switch 18 is low (i.e., a low power mode), the delta between the temperature measured by environmental sensors 108 and the true room temperature in room 12 will be low, and thus the measured temperature provided by environmental sensors 108 will be closest to accurate. At this point of low activity, smart light switch 18 can calculate a baseline temperature difference value, the baseline temperature difference value being the delta between measured temperature values between the room 12A where smart light switch 18 is located and the room 12B where smart thermostat 22 is located. By measuring this difference across multiple time periods of low activity, baseline temperature difference value for smart light switch 18 may be calculated. Additional baseline temperature difference values may be calculated between smart light switch 18 and each remote sensor 30, as well as between smart light switch 18 and other low activity smart light switches 18 within premise 10.

In most scenarios, where HVAC system 20 is properly functioning, this baseline temperature difference value of each pairing should remain relatively constant. When smart light switch 18 is engaged (either through the powering of room light 16, activation of speaker assembly 136, etc.), processor 100 may observe that the specific temperature delta between smart light switch 18 and smart thermostat 22 (or remote sensor 30, or another smart light switch 18) increases or decreases relative to the baseline temperature difference value while smart light switch 18 is in a particular set of decision tree 322 decisions. In this case, the temperature offset for that set of decision tree 322 decisions may be increased or decreased accordingly to decrease the current difference relative to the baseline temperature difference value.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A smart light switch comprising:
  a housing, the housing including a control block adapted to be operably connected to an electrical load; and
  a plurality of heat generating components, the plurality of heat generating components including:
    a light actuator located within the housing, the light actuator operable to be electrically connected with the electrical load and selectively turn the electrical load on and off;
    a processor and memory, the processor and memory being operably connected and located within the housing, the processor being adapted to selectively turn the electrical load on and off;
    a data communications module operable to provide data communication across a wireless network to a remote device; and
    at least one environmental sensor being located within the housing, the environmental sensor operable to determine a measured temperature value within the housing; wherein the processor is operable to:
      i) receive as an input, the measured temperature value from the at least one environmental sensor;
      ii) receive as an input, a power consumption value from each of the plurality of heat generating components;
      iii) select a temperature offset value from a dataset of temperature offset values that is stored in memory, each temperature offset value stored in the dataset of temperature offset values being associated with a potential combination of power consumption inputs; and
      iv) determine a calibrated temperature value from the measured temperature value adjusted by the temperature offset values selected from the dataset of temperature offset values.

2. The smart light switch of claim 1, wherein the processor is additionally operable to transmit the calibrated temperature value to a remote device via the data communications module.

3. The smart light switch of claim 1, wherein the at least one environmental sensor includes a primary temperature sensor and a secondary temperature sensor, and each of the primary temperature sensor and the secondary temperature sensor provides a measured temperature value as an input to the processor.

4. The smart light switch of claim 1, wherein the plurality of heat generating components includes a speaker assembly, and the processor receives a power consumption value for the speaker assembly based upon a current activity of the speaker assembly.

5. The smart light switch of claim 1, wherein the plurality of heat generating components includes a night light, and the processor receives a power consumption value for the night light, based upon a current activity of the night light.

6. The smart light switch of claim 1, wherein the processor receives a power consumption value based upon a CPU speed status of the processor.

7. The smart light switch of claim 1, wherein the processor receives a power consumption value based upon the On or Off status of the control block.

8. The smart light switch of claim 1, wherein the processor is operable to:
  i) receive a remote temperature value from a remote device via the data communications module;
  ii) determine a baseline temperature difference value between the remote temperature value and the calibrated temperature value when the smart light switch is in a low-powered mode using a minimum of electrical power; and
  iii) during operation of the smart light switch, determine when an application of a selected temperature offset value from the dataset of temperature offset values creates a greater difference between the calibrated temperature value and the remote temperature value than the baseline temperature difference value, and if so, modifying the selected temperature offset value.

9. The smart light switch of claim 8, wherein the smart light switch is operable to calculate a baseline temperature difference value with a plurality of remote devices, and adjust the temperature value offset by comparison to one or more of the calculated baseline temperature values.

* * * * *